United States Patent
Sakong et al.

(10) Patent No.: US 6,208,405 B1
(45) Date of Patent: Mar. 27, 2001

(54) METHOD FOR MANUFACTURING A LIQUID CRYSTAL DISPLAY

(75) Inventors: Dong-Sik Sakong, Kyungki-do; Ki-Chul Shin; Kyung-Eun Lee, both of Seoul, all of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/166,590

(22) Filed: Oct. 6, 1998

(30) Foreign Application Priority Data

Oct. 6, 1997 (KR) .................................................. 97-51180

(51) Int. Cl.⁷ .................................................. G02F 1/1341
(52) U.S. Cl. ............................................. 349/189; 349/130
(58) Field of Search ..................................... 349/123, 124, 349/130, 187, 188, 189, 191

(56) References Cited

U.S. PATENT DOCUMENTS

| 5,137,484 | * | 8/1992 | Bohannon | 445/25 |
| 5,543,949 | * | 8/1996 | Machida et al. | 349/123 |
| 5,742,370 | * | 4/1998 | Kim et al. | 349/124 |
| 6,043,860 | * | 3/2000 | Wei et al. | 349/187 |

FOREIGN PATENT DOCUMENTS 7-181491   7/1995   (JP) .

WO 91/01016   1/1991   (WO) .

\* cited by examiner

Primary Examiner—Kenneth Parker
(74) Attorney, Agent, or Firm—Pillsbury Madison & Sutro LLP

(57) ABSTRACT

A liquid crystal material is injected into a liquid crystal cell while a voltage is applied to the liquid crystal cell rendering the liquid crystal molecules parallel to the substrates. The temperature of the vacuum chamber during injection of liquid crystal material is higher than the room temperature to reduce the viscosity of the liquid crystal material, and below the liquid crystal-isotropic transition temperature to maintain the liquid crystal state. To avoid the evaporation of the liquid crystal material, the temperature is preferably lower than the clearing point of the liquid crystal material. The voltage applied to the liquid crystal cell is over the threshold voltage so that the liquid crystal molecules align themselves parallel to the substrate, and the AC voltage having a low frequency of equal to or lower than 60 Hz is preferably used to make the liquid crystal material oscillate laterally. Then, the steric hindrance and interaction between the homeotropic alignment films and the liquid crystal material is reduced and thereby reducing the injection time. In the end seal process, a voltage is applied to the liquid crystal cell as in the filling process to render the liquid crystal molecules parallel to the substrates and make the excess liquid crystal material to discharge easily, and then the injection hole is sealed.

14 Claims, 5 Drawing Sheets

METHOD FOR MANUFACTURING A LIQUID CRYSTAL DISPLAY

BACKGROUND OF THE INVENTION (a) Field of the Invention

The present invention relates to a method and apparatus for manufacturing liquid crystal displays.

(b) Description of the Related Art

A liquid crystal display (LCD) includes two substrates and a liquid crystal layer interposed therebetween. The transmittance of light is controlled by the strength of the electric field applied to the liquid crystal layer. To manufacture the liquid crystal display, two substrates having electrodes on their inner surfaces, respectively, are assembled to form an empty liquid crystal cell, and then liquid crystal material is injected into the empty cell.

A vertically aligned twisted nematic (VATN) liquid crystal display uses homeotropically aligned liquid crystal having negative dielectric anisotropy. A VATN liquid crystal display has many advantages such as a high contrast ratio, fast response time and wide viewing angle, etc. However, there are some problems in the manufacturing method of VATN LCDs. For instance, as vertical alignment films are used for homeotropic alignment, it takes five times longer than the conventional twisted nematic LCDs to fill the empty cell with liquid crystal material due to the steric hindrance and the interaction between the liquid crystal material and the vertical alignment films.

FIGS. 1 and 2 are sectional view of a conventional twisted nematic liquid crystal display and a VATN liquid crystal display, respectively. The figures are used to describe the filling process for these two conventional LCDs.

As shown in FIG. 1, two transparent insulating substrates 1 and 2 are sealed with a sealant 3, except for an injection hole 6, to define a liquid crystal cell. Alignment films 4 are formed on the inner surfaces of the substrates 1 and 2 to control the alignment of liquid crystal molecules. In the twisted nematic liquid crystal display, homogeneous alignment films are used. The liquid crystal material 5 injected through the injection hole 6 has positive dielectric anisotropy and lies parallel to the substrates 1 and 2 such that the liquid crystal material 5 easily injected into the liquid crystal cell. The arrow indicates the direction of injection.

In the VATN LCD as shown in FIG. 2, homeotropic alignment films 7 are used to align liquid crystal molecules 8 perpendicular to the substrates 1 and 2. The liquid crystal material 8 is injected through the injection hole 6 in a state where the liquid crystal molecules are standing perpendicular to the substrates 1 and 2. Therefore, it takes a longer period of time to fill the cell due in the steric hindrance and the interaction between the liquid crystal material 8 and the vertical alignment films 7.

After injecting the liquid crystal material, an end seal process takes place. In the end seal process, the liquid crystal cell is hot pressed to maintain a uniform cell gap, and then the injection hole is sealed. Generally, an ultraviolet ray hardening sealant (UV sealant) is used for the end seal. That is, a UV sealant is applied over the injection hole, after which the UV rays harden the UV sealant.

However, excess liquid crystal material continuously discharges from the liquid crystal cell after the injection due to the pressure difference between the inside and outside of the liquid crystal cell. Therefore, it is necessary for the liquid crystal cell filled with the liquid crystal material to be undisturbed for two or three hours before undertaking the end seal process. However, it is difficult to estimate a suitable amount of time because the viscosity of the liquid crystal material may vary. Especially in the VATN liquid crystal displays, the time to discharge for the excess liquid crystal material is at least twice as long as the filling process because the liquid crystal molecules are perpendicular to the substrates.

If the excess liquid crystal material is not sufficiently discharged before the end seal process, the cell gap between the substrates is not uniformly maintained. Moreover, if the UV sealant is applied while the liquid crystal material is still discharging through the injection hole, bonding strength is decreased. As a result, the sealant may loosen after hardening. In the worst case, the entire mass of fully-hardened sealant may become completely detached from the LCD. In either case, air becomes mixed with the liquid crystal layer or the liquid crystal material is discharged. In addition, time is wasted because the liquid crystal cell should be left to sit after filling for a long period of time.

SUMMARY OF THE INVENTION

It is therefore an object of the present invention to shorten the time taken to inject the liquid crystal material to the VATN liquid crystal cell.

It is another object of the present invention to obtain the uniform cell gap of a liquid crystal display.

It is still another object of the present invention to reduce the defect in the end seal process.

These and other objects, features and advantages are provided, according to the present invention, by applying a voltage to the liquid crystal cell causing the liquid crystal molecules to lie parallel to the substrates when the liquid crystal material is injected into the liquid crystal cell.

It is preferable that the temperature of the vacuum chamber during injection of liquid crystal material be higher than room temperature in order to reduce the viscosity of the liquid crystal material, and below the liquid crystal-isotropic transition temperature in order to maintain the liquid crystal state. However, in order to avoid the evaporation of the liquid crystal material, the temperature preferably is lower than the clearing point of the liquid crystal material.

The voltage applied to the liquid crystal cell is preferably over the threshold voltage so that the liquid crystal molecules themselves parallel to the substrate. Moreover, the AC (alternating current) voltage, having a low frequency of equal to or lower than 60 Hz, is preferably used to make the liquid crystal molecules oscillate laterally during the injection. It is more preferable that the frequency is in the range of 10–30 Hz.

In the end seal process, a voltage is applied to the liquid crystal cell as in the filling process to make the liquid crystal molecules parallel to the substrates and to facilitate the discharge of the excess liquid crystal material. The injection hole is then sealed.

An apparatus for the end seal process comprises means for applying pressure the over-injected liquid crystal cell to facilitate the discharge of the excess liquid crystal material injected and means for applying voltage to the liquid crystal cell.

DETAILED DESCRIPTION OF THE PREFERRED EMBODIMENTS

Figure 1:
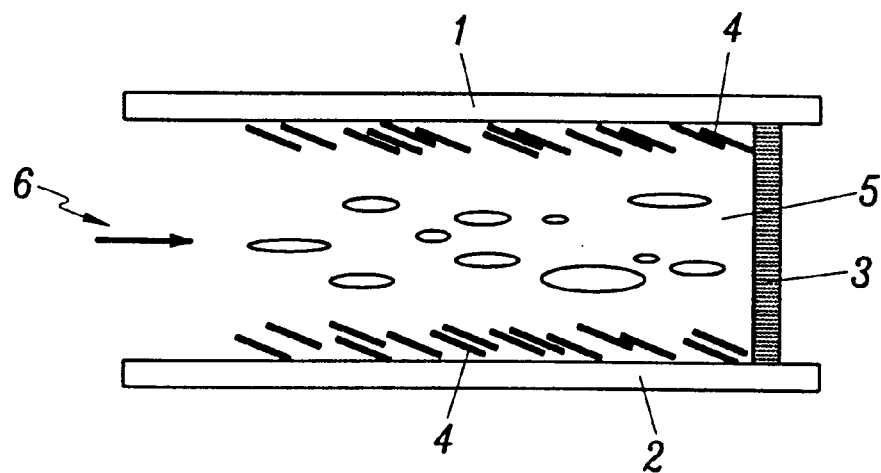
FIG. 1 is a sectional view of a conventional twisted nematic liquid crystal display during the filling process.
Figure 2:
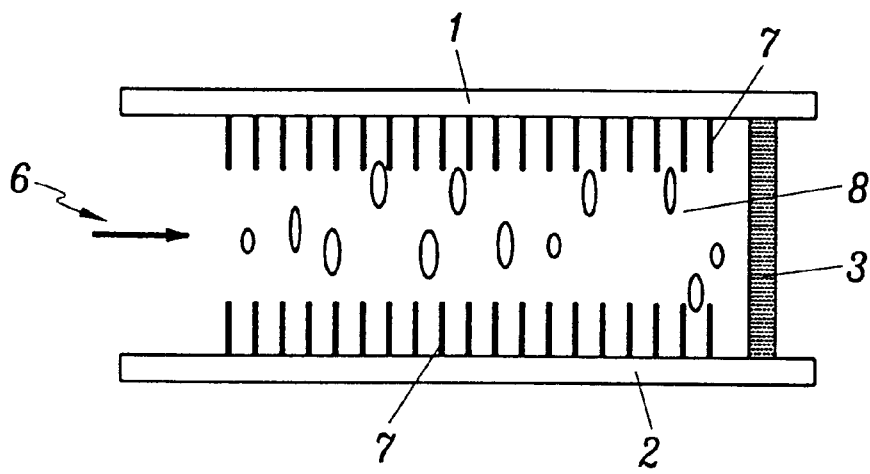
FIG. 2 is a sectional view of a conventional VATN liquid crystal display during the filling process.

The present invention will now be described more fully hereinafter with reference to the accompanying drawings, in which preferred embodiments of the present invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity.

Figure 3:
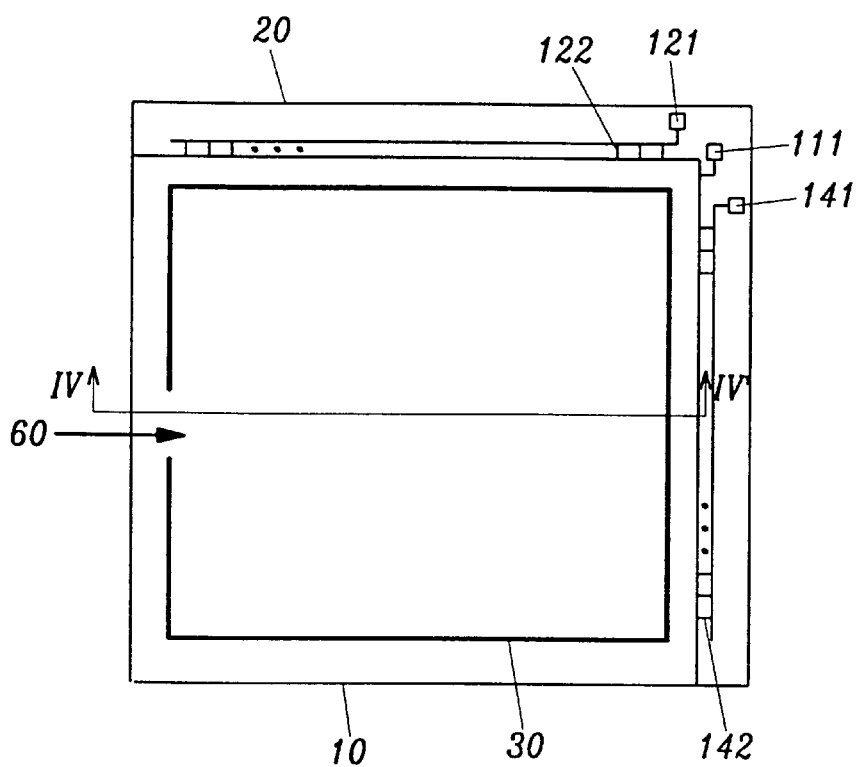
FIG. 3 is a layout view of a liquid crystal cell during the filling process according to an embodiment of the present invention.
Figure 4:
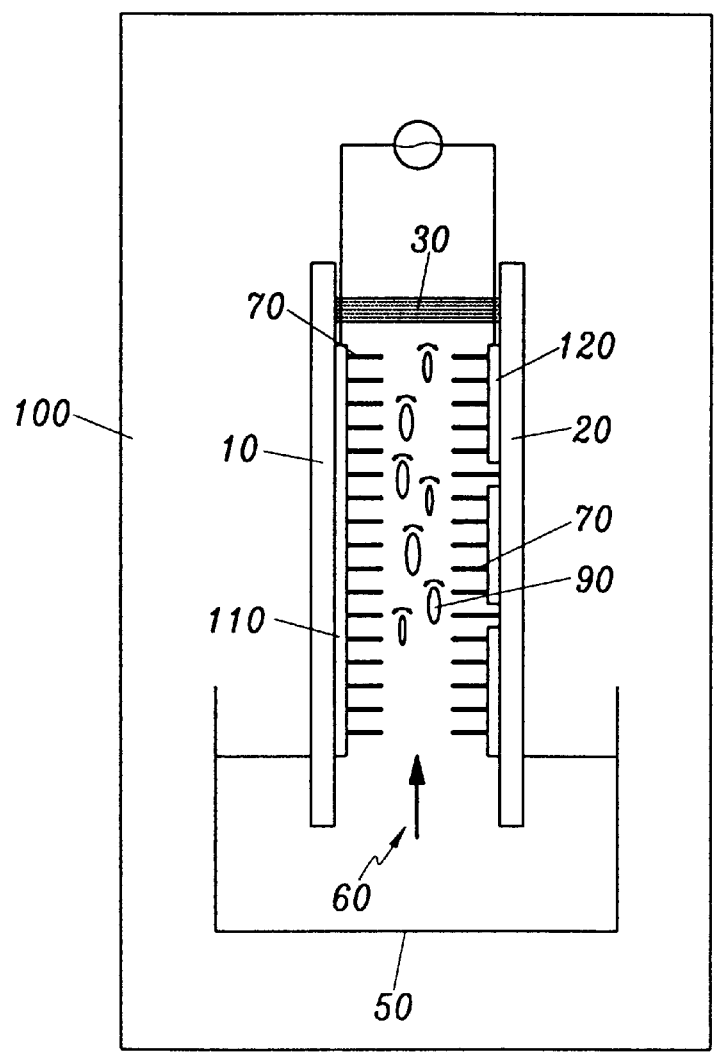
FIG. 4 is a sectional view of a VATN LCD during the filling process according to an embodiment of the present invention.

FIG. 3 is a layout view of an empty liquid crystal cell proceeding to the filling process, and FIG. 4 shows the filling process of a VATN liquid crystal display according to an embodiment of the present invention. The liquid crystal cell shown in FIG. 4 is taken along the line IV—IV' in FIG. 3.

As shown in FIGS. 3 and 4, the liquid crystal cell in the filling process includes two substrates, an upper substrate 10 and a lower substrate 20, sealed with a sealant 30 except for an injection hole 60.

A plurality of pixel electrodes 120 for displaying images and a plurality of gate lines 142 and data lines 122 for transmitting signals to the pixel electrodes 120 are formed on the inner surface of the lower substrate 20. The gate lines 142 and the data lines 122 are connected to the respective shorting bars 143 and 123, and testing electrodes 141 and 121 for applying test signals to the gate and the data lines 142 and 122 are attached to the shorting bars 143 and 123, respectively.

On the inner surface of the upper substrate 10, a common electrode 110 is formed, and a common testing electrode 111 on the inner surface of the lower substrate 20 is connected to the common electrode 110 through a silver paste (not shown) which lies between the upper and lower substrates 10 and 20.

Liquid crystal molecules are arranged parallel to the substrates 10 and 20 when an adequate voltage is applied to the electrodes 111, 121 and 141. Though the electrodes are all attached at upper right edge in the liquid crystal cell shown in FIG. 3, the positions of the electrodes may be changed, and the number of the testing electrodes may be more than one.

According to the embodiment of the present invention, the filling process takes place in the vacuum chamber 100. Adequate voltages are applied to the pixel and the common electrodes 110 and 120 in the liquid crystal cell through the testing electrodes 111, 121 and 141 attached at the edge of the substrate. Then, an electric field is generated between the substrates 10 and 20 under controlled pressure and temperature, the liquid crystal material held in the liquid crystal material container 50 is injected into the liquid crystal cell through the injection hole 60. The injected liquid crystal material 50 has negative dielectric anisotropy.

It is preferable that the temperature of the vacuum chamber 100 during injection of liquid crystal material is higher than the room temperature to reduce the viscosity of the liquid crystal material 90, and below the liquid crystal-isotropic transition temperature to maintain the liquid crystal state. However, to avoid evaporation of the liquid crystal material, the temperature is preferably lower than the clearing point of the liquid crystal material. The clearing point depends on the kind of the liquid crystal material, but it is generally in the range of 80–100° C. If the temperature is too high, the liquid crystal material evaporates to increase the dissipation of the liquid crystal material during the filling process, and the desired characteristic may not be obtained because the evaporation rates of the components of the liquid crystal mixture are different.

The voltage applied to the electrodes 110 and 120 of the substrates of the liquid crystal cell is preferably over the threshold voltage of the liquid crystal material and the direction of the electric field is perpendicular to the substrates to align the liquid crystal molecules parallel to the substrates.

Then, the liquid crystal material 80 is injected in such a state that the liquid crystal molecules lie parallel to the substrates reducing the steric hindrance and the interaction between the homeotropic alignment films and the liquid crystal material thereby reducing the injection time. While injection time depends somewhat on the viscosity of the liquid crystal material, by using the embodiment of the present invention, rather than the conventional filling process, the injection time is reduced two to fourfold.

The voltages applied to the electrodes on the substrates of the liquid crystal cell are AC (alternating-current) voltages having a low frequency equal to or lower than 60 Hz causing the liquid crystal molecules to oscillate laterally to after the director of the liquid crystal. Therefore, injection time is much reduced. It is more preferable that the frequency is in the range of 10–30 Hz.

A 1 inch×1 inch size test cell was made and tested. The result shows that the injection time was 150 minutes when the voltage was not applied, 125 minutes when a voltage of 3 V was applied, and 65 minutes when the voltage of 5 V was applied. As shown above, the injection rate doubled when the voltage of 5 V was applied than when there was an absence of voltage. This experiment was performed at room temperature and the AC voltage having 60 Hz frequency was used.

Subsequently, the voltage was maintained at 5 V and the frequency was varied. The results show that the injection time is 58 minutes when the AC voltage having 60 Hz frequency is used, 50 minutes when the frequency is 30 Hz, and 65 minutes when the frequency is 0 Hz. When a voltage having a frequency of 30 Hz is used, the injection time decreases by about 8 minutes from when a voltage having conventional frequency of 60 Hz is used. As in the first experiment, the second experiment was performed at room temperature, and the size of the test cell was the same. The difference between the first and the second experiments when a voltage having 60 Hz frequency is applied is an experimental error.

In both the first and the second experiments, polyamic acid group homeotropic alignment films were used, and ZLI 4535 MJ 9667 of Merck Co. were used for the liquid crystal layer.

The filling process according to the embodiment of the present invention may be adapted to the HAN (hybrid aligned nematic) mode liquid crystal display whose one alignment film is homeotropic and the other alignment film is homogeneous.

A liquid crystal material having negative dielectric anisotropy is used in the embodiment of the present invention. However, it is possible to adapt the filling process according to the embodiment of the present invention to the liquid crystal display using a liquid crystal material having positive dielectric anisotropy. However, the electric field applied to the liquid crystal cell should be parallel to the substrate to align the liquid crystal material parallel to the substrates.

Figure 5:
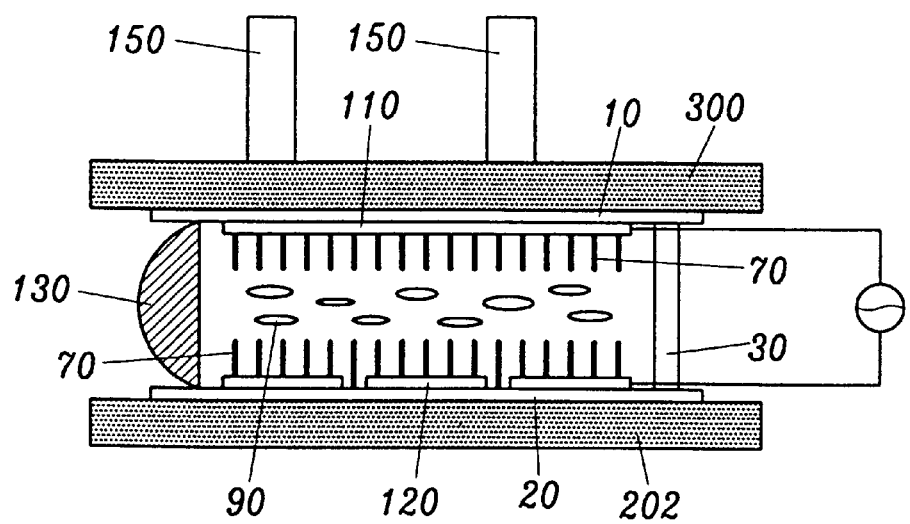
FIG. 5 is a sectional view of a VATN LCD during the end seal process according to an embodiment of the present invention.

On the other hand, an end seal process according to an embodiment of the present invention is shown in FIG. 5.

A liquid crystal cell including two transparent insulating substrates 10 and 20 assembled is prepared. Electrodes 110 and 120 are formed on the inner surfaces of the substrates 10 and 20 respectively, and homeotropic alignment films 70 are printed thereon. A liquid crystal material 90 is injected to the liquid crystal cell.

Figure 6:
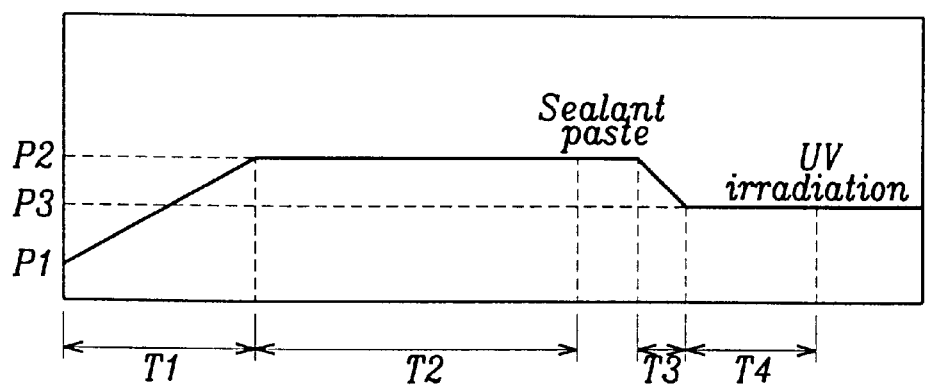
FIG. 6 is a timing chart illustrating the pressure during the end seal step according to an embodiment of the present invention.

Next, as shown in FIG. 5, plates 202 and 300 are adhered closely to the substrates 10 and 20 and press to flatten the substrates 10 and 20 using the cylinder 150 as a means for applying pressure. As shown in FIG. 6, during initial T1 time, the pressure gradually increases from P1 to P2 such that the bulging substrate 10 and 20 flatten and the excess liquid crystal material in the liquid crystal cell discharges. During the next T2 time, on maintaining the pressure P2 constantly the excess liquid crystal material 50 continuously discharges. Next, while maintaining the pressure P2, the remaining liquid crystal material in the injection hole is removed, and then an UV sealant is applied to the injection hole 60. During the next T3 time, the pressure decreases from P2 to P3, and the UV sealant is slightly drawn into the injection hole 60 due to the pressure difference between the inside and the outside of the liquid crystal display. Next, during the next T4 time, the UV sealant is flattened while constantly maintaining the pressure P3. Finally, the pressure P3 is released, and the UV sealant is hardened by ultraviolet irradiation. In the case of a VATN liquid crystal display, it is difficult to discharge the excess liquid crystal material and therefore the discharge time increases and a higher pressure should be applied than for the conventional TN liquid crystal display. However, according to the embodiment of the present invention, the time and pressure conditions employed for the conventional TN liquid crystal display may be used without significant change.

According to the embodiment of the present invention, a voltage is applied to the liquid crystal cell during the end seal process to align the liquid crystal molecules parallel to the substrates. The voltage applied to the liquid crystal cell should be equal to or more than the threshold voltage of the liquid crystal material 90. The direction of the electric field is perpendicular to the substrates when the liquid crystal material has negative dielectric anisotropy, and parallel to the substrates when the liquid crystal material has positive dielectric anisotropy.

In the latter case, the liquid crystal molecules 90 aligns themselves parallel to the substrates 10 and 20 so that the excess liquid crystal material can easily discharge through the injection hole and the amount of time decreases because the steric hindrance and the interaction between homeotropic alignment films and the liquid crystal material 90 decreases.

The voltage applied to the electrodes of the substrates of the liquid crystal cell is an AC (alternating-current) voltage having a low frequency equal to or lower than 60 Hz, it is more preferable that the frequency is in the range of 10–30 Hz, as in the filling process.

If the end seal is performed while the liquid crystal molecules are aligned parallel to the substrates as in the embodiment, the excess liquid crystal material completely discharges and there is no need to leave the liquid crystal cell undisturbed for a lengthy period of time. In addition, the UV sealant is applied after the excess liquid crystal material is completely discharged and the remaining liquid crystal material on the injection hole is removed. Therefore, there is a minimization of the possibility of the bond strength weakening, the sealant destabilizing after hardening, and the entire mass of the full-hardened sealant completely detaching itself from the LCD allowing air to enter the liquid crystal layer.

Figure 7:
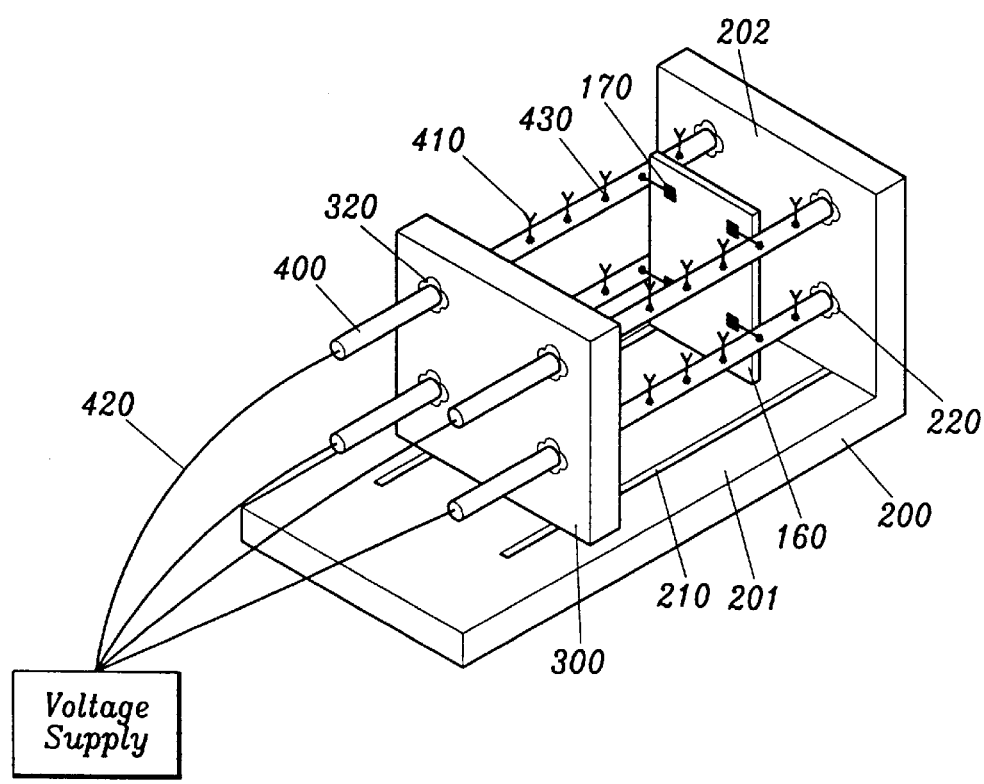
FIG. 7 is a perspective view of an apparatus for the end seal step according to an embodiment of the present invention.

FIG. 7 shows an end seal apparatus prepared for the end seal process according to the embodiment of the present invention for mass production.

The end seal apparatus according to the embodiment of the present invention, as shown in FIG. 7, includes a metal base 200 including a bottom plate 201 joined to a perpendicular side plate 202. A metal front plate 300 is fitted to move on two sliding rails 210 attached to the bottom plate 201 of the metal base 200.

A liquid crystal cell 160 filled with the liquid crystal material is placed between the side plate 202 of the metal base 200 and the metal front plate 300, and then the entire end seal apparatus is rotated onto the side plate 202 so that the metal front plate is at the top. Then, the cylinder 150 bears down onto the metal front plate 300 which in turn applies pressure to the liquid crystal cell 160. Two or more liquid crystal cells may be placed, in such a case, a sheet of paper is interposed between the liquid crystal cells.

Four bars 400 parallel to each other are placed perpendicular to and in between the metal front plate 300 and the side plate 202 of the metal base 200. A wire 420 which can be applied with a voltage is threaded inside each bar 400, and a jack 410 connected to the wire 420 is protruded through a hole 430 in the bar 400. The number of the holes 430 in the bar 400 may be varied to match the number of the cells treated at the same time. The number of the wires 420 in the bar 400 may be equal to or more than one, and the number of the jacks 410 per hole 430 may match the number of the wires 420 in the bar 400. The gate, data and common voltage supplies are, respectively, connected to at least one wire according to the structure of the electrode 170 of the liquid crystal cell 160. The remaining wire may be connected to one of three power supplies or may not be connected at all.

To manufacture the liquid crystal display using the apparatus according to the embodiment of the present invention, a liquid crystal cell 160 filled with the liquid crystal material is interposed between the metal base 200 and the metal front plate 300. The jacks 410 protruding from the holes 430 are connected to electrodes 170 of the liquid crystal cell. If the voltage is applied to each electrode 170 of the liquid crystal cell through the voltage supply, the liquid crystal molecules in the liquid crystal cell are aligned parallel to the substrates as described above. Then the metal front plate 300 moves along the sliding rails 210 to squeeze the liquid crystal cell against the side plate 202 thus discharging the cell of excess liquid crystal material.

Moreover, there are matching cross-shaped holes 220 and 320 in both the metal base 200 and the metal front plate 300 so that the bars 400 can be repositioned to accommodate the various sizes and shapes of liquid crystal cells.

As shown above, the application of a voltage to the liquid crystal cell renders the liquid crystal molecules parallel to the substrates while the liquid crystal material is injected into the liquid crystal cell and thereby decreases the injection time.

Furthermore, in the end seal process, by applying a voltage to the liquid crystal cell rendering the liquid crystal molecules parallel to the substrates while the liquid crystal material is injected, the excess liquid crystal material discharges more efficiently and the injection hole is sealed more securely.

What is claimed is:

1. A manufacturing method of a liquid crystal display, comprising the steps of:

generating an electric field in a liquid crystal cell including two substrates, at least one of the substrates having a homeotropic alignment film thereon; and injecting a liquid crystal material into the liquid crystal cell during generation of the electric field, wherein the temperature of a vacuum chamber where the steps of generating the electric field and injecting the liquid crystal material are performed is higher than room temperature and lower than a liquid crystal-isotopic transition temperature of the liquid crystal material.

2. The manufacturing method according to claim 1, wherein the temperature of the vacuum chamber is lower than the clearing point of the liquid crystal material.

3. The manufacturing method according to claim 2, wherein a voltage applied to the liquid crystal cell in the step of generating the electric field is larger than the threshold voltage of the liquid crystal material.

4. The manufacturing method according to claim 3, wherein the voltage is an AC voltage having a frequency equal to or lower than 60 Hz.

5. The manufacturing method according to claim 4, wherein the frequency of the voltage is in the range of 10–30 Hz.

6. The manufacturing method according to claim 5, wherein the liquid crystal material has negative dielectric anisotropy, and the electric field is perpendicular to the substrates.

7. The manufacturing method according to claim 5, wherein the liquid crystal material has positive dielectric anisotropy, and the electric field is parallel to the substrates.

8. A manufacturing method of a liquid crystal display, comprising the steps of:

generating an electric field in a liquid crystal cell including two substrates and a liquid crystal material therebetween, at least one of the substrates having a homeotropic alignment film thereon; and discharging the liquid crystal material from the liquid crystal cell during generation of the electric field, wherein the temperature of a vacuum chamber where the steps of generating the electric field and discharging the liquid crystal material are performed is higher than room temperature and lower than a liquid crystal-isotopic transition temperature of the liquid crystal material.

9. The manufacturing method according to claim 8, further comprising the steps of:

pressing the liquid crystal cell to have a uniform cell gap;

applying a sealant to an injection hole of the liquid crystal cell; and hardening the sealant to seal the injection hole.

10. The manufacturing method according to claim 9, wherein a voltage applied to the liquid crystal cell in the step of generating the electric field is larger than the threshold voltage of the liquid crystal material.

11. The manufacturing method according to claim 10, wherein the voltage is an AC voltage having a frequency equal to or lower than 60 Hz.

12. The manufacturing method according to claim 11, wherein the frequency of the voltage is in the range of 10–30 Hz.

13. The manufacturing method according to claim 12, wherein the liquid crystal material has negative dielectric anisotropy, and the electric field is perpendicular to the substrates.

14. The manufacturing method according to claim 12, wherein the liquid crystal material has positive dielectric anisotropy, and the electric field is parallel to the substrates.

* * * * *